United States Patent
Sawada et al.

(12)

(10) Patent No.: US 6,624,536 B1
(45) Date of Patent: Sep. 23, 2003

(54) ELECTROMAGNETIC NOISE REDUCING DEVICE, NOISE REDUCING ELECTRONIC COMPONENT AND ELECTRONIC APPLIANCE MANUFACTURING METHOD

(75) Inventors: Hideo Sawada, Hadano (JP); Hiromu Ishihara, Hadano (JP); Hitoshi Yokota, Kawasaki (JP); Takashi Suga, Yokohama (JP); Tsutomu Hara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/361,226

(22) Filed: Jul. 27, 1999

(30) Foreign Application Priority Data

Jul. 29, 1998 (JP) .......................... 10-213573

(51) Int. Cl.$^7$ ................................ H05K 9/00
(52) U.S. Cl. ......................................... 307/91
(58) Field of Search ....................... 307/89–91

(56) References Cited

U.S. PATENT DOCUMENTS

| | | | | |
|---|---|---|---|---|
| 4,519,664 A | * | 5/1985 | Tillotson | 339/143 R |
| 4,964,012 A | * | 10/1990 | Kitagawa | 361/113 |
| 4,964,013 A | * | 10/1990 | Kitagawa | 361/113 |
| 5,373,296 A | * | 12/1994 | Ishino et al. | 342/4 |
| 5,455,117 A | * | 10/1995 | Nagano et al. | 428/545 |
| 5,629,713 A | * | 5/1997 | Mailandt et al. | 343/808 |
| 5,831,324 A | * | 11/1998 | Bang | 257/508 |
| 5,847,628 A | * | 12/1998 | Uchikoba et al. | 333/204 |

FOREIGN PATENT DOCUMENTS

| | | |
|---|---|---|
| JP | 7-22244 | 1/1995 |
| JP | 7-240595 | 9/1995 |

* cited by examiner

Primary Examiner—Gregory J. Toatley, Jr.
(74) Attorney, Agent, or Firm—Mattingly, Stanger & Malur, P.C.

(57) ABSTRACT

An electronic apparatus is comprised of a circuit apparatus; and an electromagnetic wave absorbing device arranged in the vicinity of the circuit apparatus in an insulating manner with respect to a circuit of the circuit apparatus, and having a metal loop, a portion of which is made of a high resistor. The metal loop contains a first member having a resistor having a resistance value smaller than, or equal to several ohms; and a second member having a resistor having a resistance value larger than, or equal to several ohms, and connected so as to form an electric loop in combination with the first member. The electromagnetic wave absorbing device containing a first member having a resistor having a resistance value smaller than, or equal to several ohms; and a second member having a resistor having a resistance value larger than, or equal to several ohms, and connected so as to form an electric loop in combination with the first member, is mounted on an adhesive tape and the like in order to be attached to an arbitrary electronic appliance. Also, this electromagnetic wave absorbing device is mounted on a circuit board, and an electronic component such as an IC and an LSI as a portion of this structure. As a result, this electromagnetic wave absorbing device realizes suppressions and reductions of electromagnetic noise such as EMI and higher harmonic waves thereof.

5 Claims, 12 Drawing Sheets

FIG.5
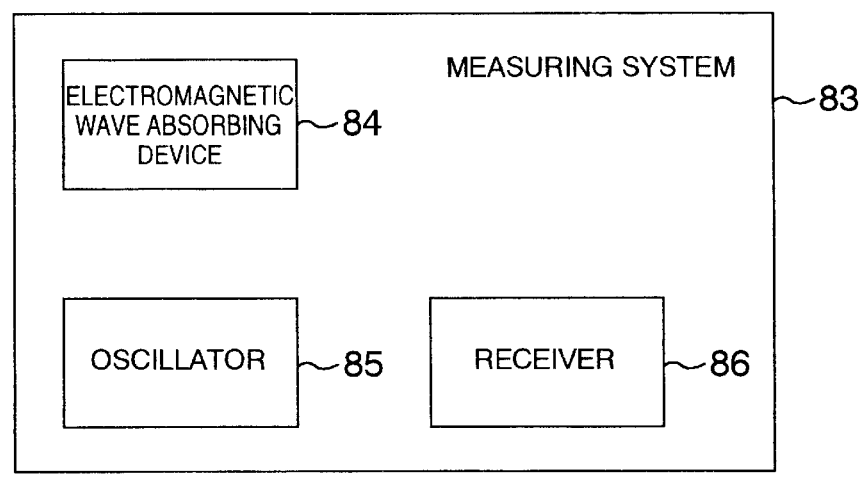
FIG.6A          FIG.6B          FIG.6C
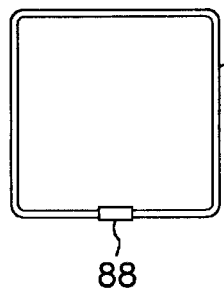   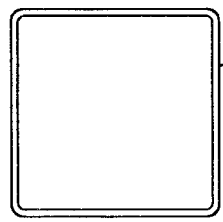   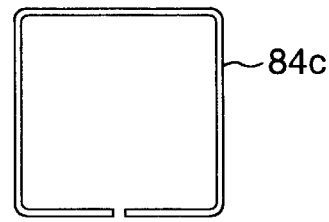

ELECTROMAGNETIC NOISE REDUCING DEVICE, NOISE REDUCING ELECTRONIC COMPONENT AND ELECTRONIC APPLIANCE MANUFACTURING METHOD

BACKGROUND OF THE INVENTION

The present invention generally relates to an electromagnetic wave absorbing technique and also an electronic appliance with employment of this electromagnetic wave absorbing technique. More specifically, the present invention is directed to such a technique capable of lowering, or reducing emission noise, e.g., EMI (electromagnetic interference).

While various sorts electronic appliances are widely marketed which are typically known as, for instance, desk-top type personal computers, portable type personal computers, and furthermore, mobile communication terminals, e.g., portable telephones, various types of electromagnetic noise waves so-called as "EMI" are emitted,or radiated from these various electronic appliances. As a result, since these unwanted electromagnetic noise waves may cause environmental pollution, this fact may cause a serious problem. To avoid such environmental pollution, voluntary controls, e.g., the FCC VCCI rules are established by electronic appliance industries.

The conventional techniques capable of reducing EMI noise emitted from electronic appliances are known as follows. For instance, as described in JP-A-7-22244, the emission noise is absorbed by the resonant circuit having the resonant frequency defined by the inductance "L" and the capacitance "C".

Also, JP-A-7-240595 discloses the following EMI reducing technique. That is, on the printed board, the signal line and the power supply line, the ground layer, and furthermore, the frame-shaped frame ground pattern are sandwiched along the upper/lower directions by employing both the frame ground solid pattern made of the conductor and the ground plane made of the conductor in order that the electromagnetic waves emitted from the signal line, the power supply line, and the ground layer are shielded.

However, the first-mentioned conventional EMI reducing technique owns the below-mentioned technical problem. That is, while electronic circuits are operable under high speeds and are manufactured in high integration (with employment of very fine techniques), it is practically impossible to set such a resonant circuit in the vicinity of emission noise producing sources because of physical limitations.

The last-mentioned conventional EMI reducing technique has the following technical problem. Although this conventional electromagnetic wave shielding technique may have the advantageous effect with respect to the EMI noise produced within the printed circuit board, this shielding technique cannot have particular advantages as to the EMI noise produced from the IC and the LSI mounted on this printed circuit board, and furthermore, the EMI noise emitted from such an electronic appliance equipped with this printed circuit board.

SUMMARY OF THE INVENTION

The present invention has been made to solve these conventional problems, and therefore, has an object to provide a technique capable of firmly suppressing noise emitted from an electric/electronic appliance in a simple manner.

Another object of the present invention is to provide a technique capable of firmly suppressing noise emitted from an electric/electronic appliance in low cost.

A further object of the present invention is to provide a technique capable of suppressing noise emitted from various appliances having various shapes/dimensions and operable under various use environment.

In accordance with the present invention, it is provided such electromagnetic wave absorbing device comprising:
a first member having a resistor having a resistance value smaller than, or equal to several ohms; and
a second member having a resistor having a resistance value larger than, or equal to several ohms, and connected so as to form an electric loop in combination with the first member.

Also, in accordance with the present invention, there are provided both an electronic apparatus manufacturing method and an electronic apparatus comprising:
a circuit apparatus; and
an electromagnetic wave absorbing device arranged in the vicinity of the circuit apparatus in an insulating manner with respect to a circuit of the circuit apparatus, and having a metal loop, a portion of which is made of a high resistor.

Furthermore, it is preferable such that a portion of the high resistor has a resistance value higher than, or equal to 20 ohms and lower than, or equal to 200 ohms, whereas the remaining portion of the metal loop has a resistance value lower than, or equal to 1 ohm.

Also, in accordance with the present invention, it is possible to provide such an electromagnetic wave absorbing method wherein:
electric energy induced in an antenna portion by an electromagnetic wave is converted into thermal energy by a resistor portion connected to the antenna portion, whereby the electromagnetic wave is attenuated.

Also, according to the present invention, it is provided such an electromagnetic wave absorbing device comprising:
an electromagnetic wave absorbing structure containing an antenna portion resonated with an electromagnetic wave; and a resistor portion series-connected to the antenna portion.

Further, according to the present invention, it is provided such an electronic component comprising: an electromagnetic wave absorbing structures containing an antenna portion resonated to an electromagnetic wave; and a resistor portion series-connected to the antenna portion.

In this electromagnetic wave absorbing device, the antenna portions of the electromagnetic wave absorbing structures are connected to both ends of the resistor portion; and each of these antenna portion is constituted by one pair of dipole antennas. The dipole antenna has a length substantially equal to a ¼ wavelength of the electromagnetic wave.

Also, according to the present invention, the antenna portion of the electromagnetic wave absorbing structure is constituted by a loop antenna connected to both ends of the resistor portion; and the loop antenna has a length which is resonated with the electromagnetic wave.

Preferably, such an electromagnetic wave absorbing device is mounted on a flexible insulating film member having an adhesive surface. Then, this electromagnetic wave absorbing device may be mounted via this adhesive surface on a desirable electronic appliance, and may be therefore mounted on an arbitrary position. Also, in such a case that the electromagnetic wave absorbing device is mounted on the insulating film member, the antenna portions of the electromagnetic wave absorbing structures may be cut at any lengths thereof together with this insulating film member. The antenna portion may be set to such an arbitrary length defined by considering the wavelength of the electromagnetic wave to be absorbed. Also, a plurality of electromagnetic wave absorbing structures equipped with antenna portions having different lengths from each other are mounted in one group. As a result, these electromagnetic wave absorbing devices may absorb the electromagnetic waves located within an arbitrary wavelength range.

BRIEF DESCRIPTION OF THE DRAWINGS

A more better understanding of the present invention is made of a detailed description to be read in conjunction with the accompanying drawings, in which:

FIG. 5 illustratively indicates an arrangement of a test apparatus for testing the electromagnetic wave absorbing device according to the present invention;

FIG. 6A to FIG. 6C are schematic diagrams for indicating shapes of electromagnetic wave absorbing devices which are mutually tested by the test apparatus in a comparison manner;

DETAILED DESCRIPTION OF THE EMBODIMENTS

Referring now to drawings, various embodiments of the present invention will be described in detail.

Embodiment Mode 1

Figure 1:
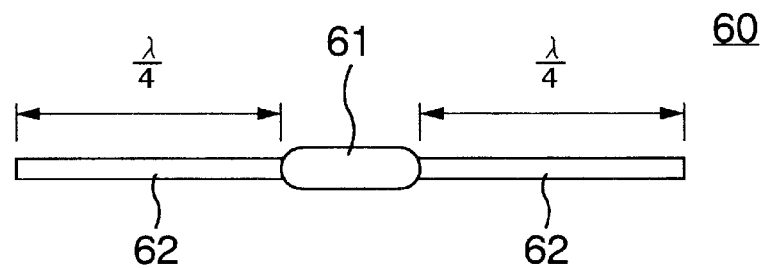
FIG. 1 is a conceptional diagram for representing an example of a structure of an electromagnetic wave absorbing device for embodying an electromagnetic wave absorbing method according to an embodiment of the present invention.

FIG. 1 is a conceptual drawing for indicating an example of a structure of an electromagnetic wave absorbing device for embodying an electromagnetic wave absorbing method according to an embodiment of the present invention.

An electromagnetic wave absorbing device 60, according to this embodiment mode 1 of the present invention, is equipped with an electromagnetic wave absorbing structure manufactured by that a plurality of dipole antennas 62 are connected to both ends of a real resistor 61, and these plural dipole antennas 62 own lengths which are resonated with an electromagnetic wave to be absorbed (for instance, a length substantially equal to a ¼ wavelength "λ" of electromagnetic wave to be absorbed). Then, since this electromagnetic wave absorbing device 60 is positioned within the electromagnetic wave to be absorbed, the plural dipole antennas 62 are resonated with this electromagnetic wave, so that a high frequency current is induced. Since the induced high frequency current flows through the real resistor 61, this high frequency current may disappear in the form of thermal energy. In other words, the electromagnetic wave absorbing device 60 may have such an effect capable of absorbing the electromagnetic wave having the wavelength "λ" (otherwise, higher harmonic wave of "λ/n (symbol "n" being an integer)") in the device setting environment to attenuate this electromagnetic wave, or so that this electromagnetic wave may disappear.

As a consequence, since the electromagnetic wave absorbing device 60 according to this embodiment mode 1 is mounted on, for example, the source for generating the harmful electromagnetic wave having the wavelength "λ" such as EMI (electromagnetic interference), this electromagnetic wave absorbing device 60 can suppress radiations of the harmful electromagnetic wave and the higher harmonic waves thereof generated from such a generating source so as to reduce the EMI and the like.

Also, since the electromagnetic wave absorbing device 60 owns the simple structure, this electromagnetic wave absorbing device can be manufactured in low cost and in an arbitrary very fine dimension in accordance with the photolithography technique and the like.

Embodiment Mode 2

Figure 2:
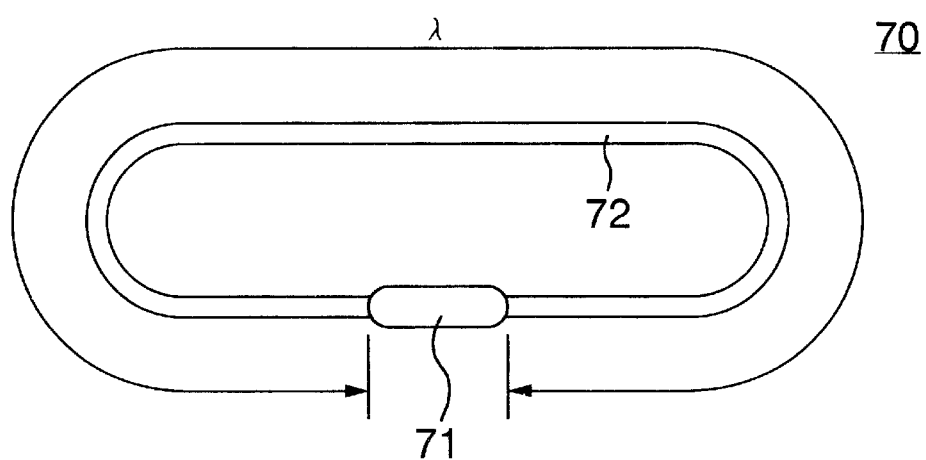
FIG. 2 is a conceptional diagram for representing an example of a structure of an electromagnetic wave absorbing device for embodying an electromagnetic wave absorbing method according to an embodiment of the present invention.

FIG. 2 is a conceptual drawing for indicating an example of a structure of an electromagnetic wave absorbing device for embodying an electromagnetic wave absorbing method according to an embodiment 2 of the present invention.

An electromagnetic wave absorbing device 70, according to this embodiment mode 2 of the present invention, is equipped with an electromagnetic wave absorbing structure manufactured by that a loop antenna 72, both ends of which are connected to each other, is connected to both ends of a real resistor 71, and this loop antenna 72 owns such a length which is resonated with an electromagnetic wave to be absorbed (for instance, a length substantially equal to a ¼ wavelength "λ" of electromagnetic wave to be absorbed). Then, since this electromagnetic wave absorbing device 70 is positioned within the electromagnetic wave to be absorbed, the loop antenna 72 is resonated with this electromagnetic wave, so that a high frequency current is induced. Since the induced high frequency current flows through the real resistor 71, this high frequency current may disappear in the form of thermal energy. In other words, the electromagnetic wave absorbing device 70 may have such an effect capable of absorbing the electromagnetic wave having the wavelength "λ" (otherwise, higher harmonic wave of "λ/n (symbol "n" being an integer)") in the device setting environment to attenuate this electromagnetic wave, or so that this electromagnetic wave may disappear.

As a consequence, since the electromagnetic wave absorbing device 70 according to this embodiment mode 2 is mounted on, for example, the source for generating the harmful electromagnetic wave having the wavelength "λ" such as EMI (electromagnetic interference), this electromagnetic wave absorbing device 70 can suppress radiations of the harmful electromagnetic wave and the higher harmonic waves thereof generated from such a generating source so as to reduce the EMI and the like.

Embodiment Mode 3

Figure 3:
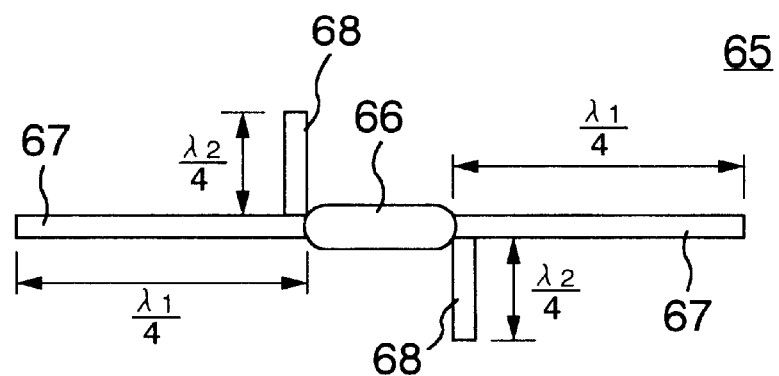
FIG. 3 is a conceptional diagram for showing a modification example of an electromagnetic wave absorbing device for embodying the electromagnetic wave absorbing method according to the embodiment of the present invention indicated in FIG. 1.

FIG. 3 is a conceptual drawing for indicating an example of a structure of an electromagnetic wave absorbing device for embodying an electromagnetic wave absorbing method according to an embodiment 3 of the present invention.

An electromagnetic wave absorbing device 65, according to this embodiment mode 3 of the present invention, is equipped with an electromagnetic wave absorbing structure manufactured by that plural sorts of dipole antennas 67 and 68 connected to both ends of a real resistor 66, and these plural dipole antennas 67 and 68 own lengths which are resonated with different electromagnetic waves to be absorbed, and furthermore, these dipole antennas 67 and 68 own different wavelengths of "λ1" an "λ2". Then, since this electromagnetic wave absorbing apparatus 65 is positioned within the electromagnetic wave to be absorbed, the dipole antenna 67 or 68 is resonated with this electromagnetic wave, so that a high frequency current is induced. Since the induced high frequency current flows through the real resistor 66, this high frequency current may disappear in the form of thermal energy. In other words, the electromagnetic wave absorbing device 65 may have such an effect capable of absorbing the electromagnetic wave having the wavelength "λ1", or "λ2" in the device setting environment to attenuate this electromagnetic wave, or so that this electromagnetic wave may disappear.

As a consequence, since the electromagnetic wave absorbing device 65 according to this embodiment mode 3 is mounted on, for example, the source for generating the harmful electromagnetic wave having the wavelength "λ" such as EMI (electromagnetic interference), this electromagnetic wave absorbing device 65 can suppress radiations of the harmful electromagnetic wave having the wavelength of "λ" generated from such a generating source so as to reduce the EMI and the like.

Embodiment Mode 4

Figure 4:
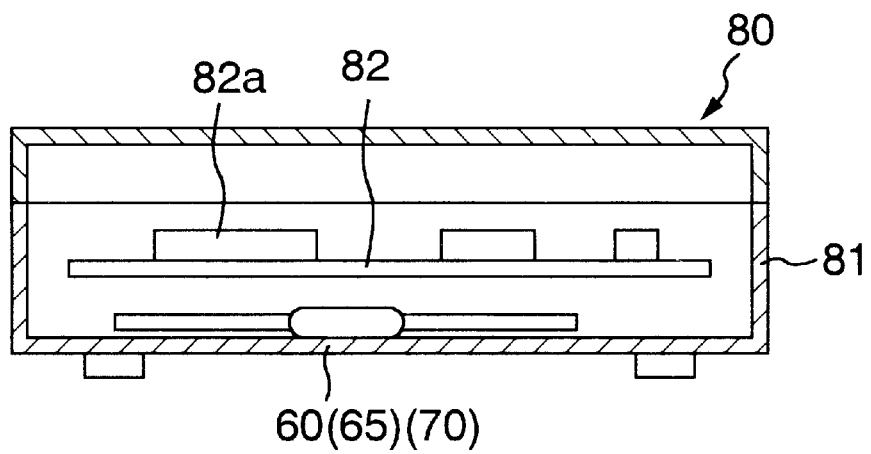
FIG. 4 is a sectional view for showing an example of a construction of an electronic appliance equipped with the electromagnetic wave absorbing device for embodying the electromagnetic wave absorbing method according to one embodiment of the present invention.

FIG. 4 is a sectional view for representing an example of an arrangement of an electronic appliance equipped with an electromagnetic wave absorbing device used to embody an electromagnetic wave absorbing method according to an embodiment mode of the present invention.

This electronic appliance 80 is constructed by that a circuit board 82 on which an electronic component 82a such as an IC and an LSI is mounted is built into a housing 81.

In this embodiment mode 4, the electronic appliance 80 is arrayed in such a manner that either an electromagnetic wave absorbing device 60 (65) or another electromagnetic wave absorbing device 70 is positioned in the vicinity of the circuit board 82 built inside the housing 81. In this case, the length of the dipole antenna 62 (67, 68) employed in the electromagnetic wave absorbing device 60 (65) is designed to be equal to such a length which is resonated with electromagnetic noise such as EMI produced from the circuit board 82 and the like. Also, when the electromagnetic wave absorbing device 70 is employed, the length of the loop antenna 72 is designed to be equal to such a length (for example, substantially equal to wavelength of electromagnetic noise) which is resonated with the electromagnetic noise such as EMI produced from the circuit board 82 and the like.

Alternatively, in the case that the housing 81 is made of resin, either the electromagnetic wave absorbing device 60 (65) or the electromagnetic wave absorbing device 70 may be embedded into a wall surface of this resin housing 81.

As previously described, since the electromagnetic wave absorbing device 60, or 70 is arranged in the vicinity of the circuit board 82 assembled within the housing 81, this electromagnetic wave absorbing device 60, or 70 can effectively absorb such harmful electromagnetic waves as EMI produced from the electronic component 82a and the like provided in the circuit board 82. For instance, the strength of the electromagnetic noise radiated from the electronic appliance 80 to the setting environment can be effectively reduced lower than, or equal to, for example, noise strength standard used in certain industries such as FCC VCCI rules.

FIG. 5 schematically shows a measuring system 83 for testing effects of electromagnetic wave absorbing devices according to the present invention. In this measuring system 83, a receiver 86 is arranged at a position separated from an oscillator 85 by a distance of 5 meters along a horizontal direction. The oscillates 85 oscillates an electromagnetic wave having a frequency of 1,290 MHz. The receiver 86 is equipped with a signal strength meter capable of indicating a reception strength of the electromagnetic wave having the frequency of 1,290 MHz, which is captured by an omnidirectional (monodirectional)antenna. The electromagnetic wave absorbing device 84 according to the present invention is arranged at a position above the omnidirectional antenna of the oscillator 85 along the vertical direction by a distance of 3 cm.

FIG. 6A, FIG. 6B, and FIG. 6C illustratively show structures of electromagnetic wave absorbing devices 84a, 84b, and 84c, which are measured by the measuring system 83 shown in FIG. 5. Each of these electromagnetic wave absorbing devices 84a, 84b, and 84c is such a loop antenna.

That is, this loop antenna has a regular square, one edge of which is 61 mm, and this loop antenna is made of copper, the diameter of which is 1.5 mm. A resistor 88 having a resistance value of 100 ohms is connected to the electromagnetic wave absorbing device 84a. The remaining electromagnetic wave absorbing devices 84b and 84c are samples which are manufactured so as to grasp the characteristic specific to this measuring system 83. The former electromagnetic wave absorbing device 84b owns such a structure that no resistor is connected, and a copper wire is shortcircuited. The latter electromagnetic wave absorbing device 84c owns such a structure that no resistor is connected, and a portion of the copper wire is cut out, namely such a resistor having an essentially infinitive resistance value is connected.

The measurement result acquired by this measuring system 83 is indicated in table 1.

TABLE 1

| R = 100 ohms | R = 0 ohm | R = infinitive ohm |
|---|---|---|
| −5.58 dB | −3.06 dB | −0.72 dB |
| (72% attenuated) | (51 attenuated) | (15% attenuated) |

In this measurement result, the measurement values of the receiver 86 were calibrated by 3 dB under condition of ΛS=1. A pair of the electromagnetic wave absorbing devices and the oscillator 85 were rotated so as to select such a position where a maximum signal strength could be obtained, and attenuations in relative electromagnetic wave strengths were measured in such a case that the respective electromagnetic wave absorbing devices 84a, 84b, and 84c were arranged at the above-described positions by the distance of 3 cm along the vertical direction, while setting a condition under which no electromagnetic wave absorbing device is provided as a reference.

Embodiment Mode 5

Figure 7:
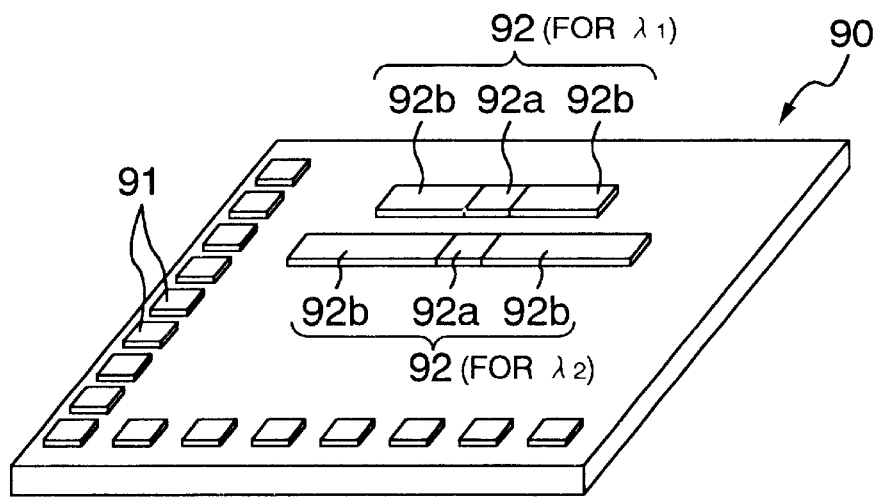
FIG. 7 is a perspective view for indicating an example of a structure of an electronic component equipped with the electromagnetic wave absorbing device for embodying the electromagnetic wave absorbing method according to one embodiment of the present invention.

FIG. 7 is a perspective view for representing an example of a structure of an electronic component equipped with an electromagnetic wave absorbing device for embodying an electromagnetic wave absorbing method according to an embodiment of the present invention.

In this embodiment mode 5, the electromagnetic wave absorbing device is applied to a semiconductor chip 90 as an example of the electronic component. In the semiconductor chip 90 of this embodiment mode 5, a circuit structure (not shown) having a desirable function is formed, and a plurality of pads 91 are provided on an outer surface thereof. An external connection terminal (not shown) is connected to these pads 91 so as to supply/receive a signal and electric power to/from an external circuit.

In this case of the above-described semiconductor chip 90, for example, while using a portion of an internal wiring layer, this semiconductor chip 90 owns an electromagnetic wave absorbing device 92 which the completely independently formed from the original circuit structure of this semiconductor chip 90. This electromagnetic wave absorbing device 92 is equipped with a resistor portion 92a and a plurality of dipole antennas 92b, the preselected lengths of which are connected to both ends of this resistor portion 92a. The resistor portion 92a and the dipole antennas 92b may be manufactured by employing, for example, such a substance used in a wafer process technique as a circuit portion and a wiring line portion of a circuit structure. The length of the dipole antenna 92b is set to be equal to such a length which may be resonated with electromagnetic noise such as EMI probably produced from the packaging environment thereof.

As exemplified in FIG. 7, a plurality of electromagnetic wave absorbing devices 92 are formed and the lengths of the dipole antennas 92b are different from each other, so that both the electromagnetic noise such as EMI and the higher harmonic waves thereof within an arbitrary wavelength range can be absorbed by these electromagnetic wave absorbing devices 92.

As previously explained, since the semiconductor chip 90 of this embodiment mode is partially provided with the electromagnetic wave absorbing devices 92, these electromagnetic wave absorbing devices 92 can effectively absorb the electromagnetic noise such as EMI produce from the semiconductor device 90, and can achieve such an effect that the electromagnetic noise which is emitted from the semiconductor chip 90 itself, or emitted from the circuit system on which this semiconductor chip 90 is mounted to the setting environment.

It should be noted that a more effective advantage of the present invention can be conceived when, for instance, active logic elements having high operating frequencies such as a microprocessor and an ASIC, functioning as the semiconductor chip 90, are equipped with the electromagnetic wave absorbing devices. Alternatively, this electromagnetic wave absorbing device may be widely applied to general-purpose semiconductor devices which emit EMI and electromagnetic noise. Also, the present invention is not limited only to such an electromagnetic wave absorbing device equipped with the dipole antenna, but may be similarly applied to such an electromagnetic wave absorbing device equipped with the lop antenna as indicated in FIG. 2, and also to another electromagnetic wave absorbing device equipped with both a loop antenna and a dipole antenna.

Embodiment Mode 6

Figure 8:
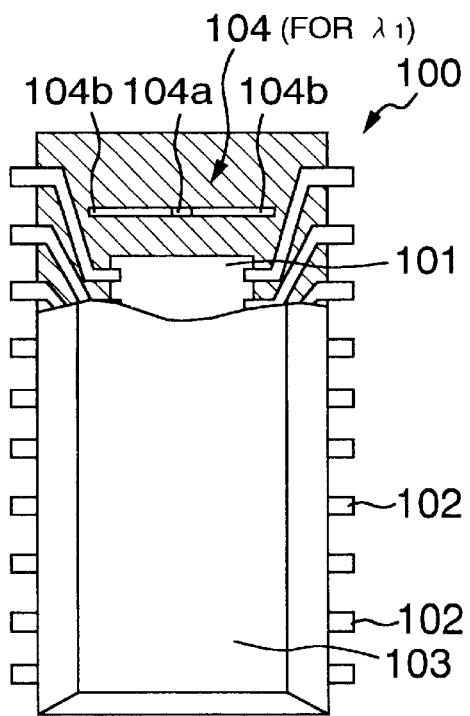
FIG. 8 is a sectional view for representing an example of a structure of an electronic component equipped with the electromagnetic wave absorbing device for embodying the electromagnetic wave absorbing method according to one embodiment of the present invention.

FIG. 8 is a sectional view for representing an example of a structure of an electronic component equipped with an electromagnetic wave absorbing device for embodying an electromagnetic wave absorbing method according to an embodiment of the present invention.

In this embodiment mode 6 shown in FIG. 8, the electromagnetic wave absorbing device is equipped with a portion of a sealing structure of a semiconductor device.

In other words, a semiconductor device 100, according to this embodiment mode 6, is constituted by a semiconductor chip 100 having a desirable function; a plurality of leads 102 connected to this semiconductor chip 101; and also a package 103 constructed of molded resin, which may seal this semiconductor chip 101 and inner edge portions of the plural leads 102.

In this embodiment mode, an electromagnetic wave absorbing device 104 is built in the package 103. This electromagnetic wave absorbing device 104 is equipped with an electromagnetic wave absorbing structure constituted by a resistor portion 104a and a plurality of dipole antennas 104b connected to both ends of this resistor portion 104a. This electromagnetic wave absorbing device 104 may be formed, for example, as a portion of a lead frame for forming the lead 102.

The length of the dipole antenna 104b is set to be equal to such a length which may be resonated with electromagnetic noise such as EMI probably produced from the packaging environment thereof, and also from the semiconductor device 100. As a result, this electromagnetic noise and the higher harmonic waves thereof can be effectively absorbed so as to disappear by this electromagnetic wave absorbing device 104, so that the effective EMI prevention can be established.

Alternatively, similar to the above-described case of FIG. 7, while a plurality of electromagnetic wave absorbing devices 104 are provided within the package 103 and the lengths of the dipole antennas thereof are different from each other, both the electromagnetic noise such as EMI and the higher harmonic waves thereof within an arbitrary wavelength range may be absorbed by these electromagnetic wave absorbing devices 104.

Embodiment Mode 7

Figure 9:
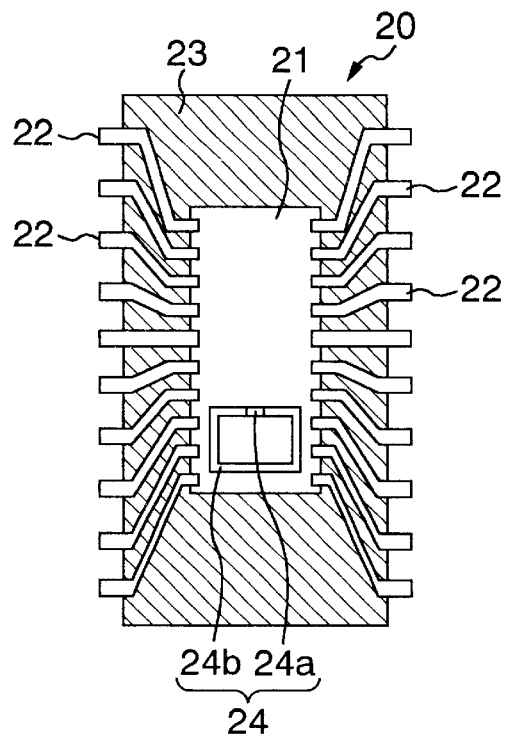
FIG. 9 is a sectional view for showing an example of a structure of a semiconductor device corresponding to an example of an electronic component for embodying the electromagnetic wave absorbing method of the present invention.

FIG. 9 is a sectional view for representing an example of a structure of a semiconductor device corresponding to an electronic component for embodying an electromagnetic wave absorbing method according to an embodiment of the present invention.

FIG. 9 shows a sectional view of a mounting position of a semiconductor chip 21 provided in a semiconductor device 20 such as an IC and an LSI. In other words, the semiconductor chip 21 is connected to a plurality of leads 22 cut out from a lead frame by way of a bonding wire method, and furthermore, both inner edge portions of these plural leads 22 and the semiconductor chip 21 are sealed inside a package 23 which is, for instance, molded and made of insulating resin and the like.

In this embodiment mode 7, an electromagnetic wave absorbing device 24 is separately formed on the semiconductor chip 21, and this electromagnetic wave absorbing device 24 is constituted by a resistor portion 24a and a loop antenna 24b connected to both ends of this resistor portion 24a. The electromagnetic wave absorbing device 24 may be manufactured in accordance with the following methods to be formed with the semiconductor chip 21 in an integral body. That is to say, for instance, while a wiring material such as aluminium is employed together with the well-known wafer process used in the step for manufacturing the semiconductor chip 21, this electromagnetic wave absorbing device 24 may be separately formed as a portion of a conductor layer located under a final insulating film (namely, passivation film). Alternatively, this electromagnetic wave absorbing device 24 may be formed on an outer surface of the final insulating film by using, for example, a patter printing method.

Then, since the electromagnetic wave absorbing device 24 is resonated to electromagnetic noise such as EMI and higher harmonic waves thereof, which are emitted from the semiconductor chip 21, this electromagnetic wave absorbing device 24 can absorb this electromagnetic noise as thermal energy and can cause the thermal energy to be dissipated. As a consequence, reducing of EMI emitted from the semiconductor chip 21 can be realized.

Figure 10:
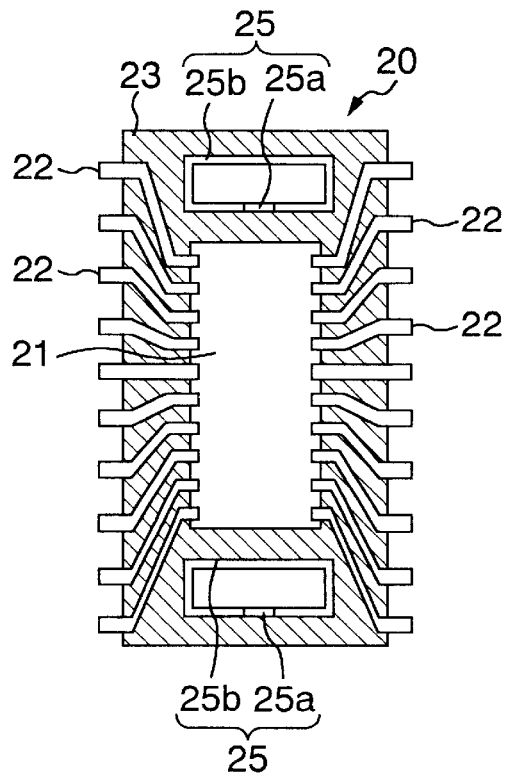
FIG. 10 is a sectional view for indicating a modification of the structure of the semiconductor device corresponding to an example of the electronic component for embodying the electromagnetic wave absorbing method of the present invention.

FIG. 10 illustratively shows such a case that an electromagnetic wave absorbing device 25 is formed as a portion of a lead frame of an IC. In other words, as a portion of the lead framed which constitutes a plurality of leads 22, such an electromagnetic wave absorbing device 25 constituted of a resistor portion 25a and a loop antenna 25b is formed. While a package 23 is molded, this electromagnetic wave absorbing device 25 is embedded into this package 23. At a step when the plural leads 22 are cut out from the lead frame, the electromagnetic wave absorbing device 25 may be left inside the package 23 while being sealed.

Also, in this case, the electromagnetic noise such as EMI which is produced when the semiconductor chip 21 is operated can be converted into thermal energy by the electromagnetic wave absorbing device 25, so that this thermal energy may disappear, and thus the reduction of EMI emitted from the semiconductor chip 21 can be realized.

Embodiment Mode 8

Figure 11:
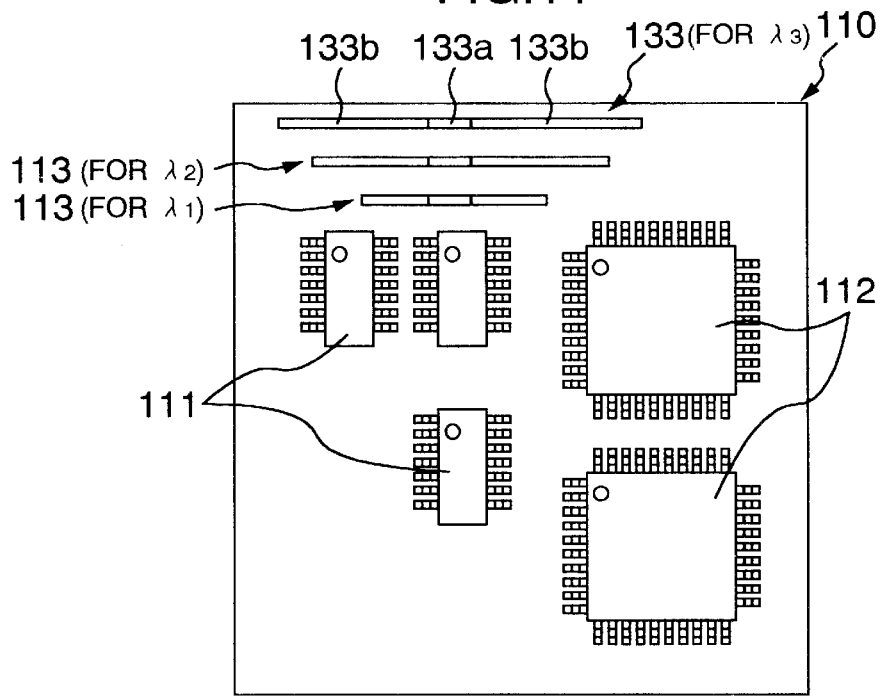
FIG. 11 is a plan view for showing an example of a structure of an electronic component equipped with the electromagnetic wave absorbing device for embodying the electromagnetic wave absorbing method according to one embodiment of the present invention.

FIG. 11 is a plan view for representing an example of a structure of an electronic component equipped with an electromagnetic wave absorbing device for embodying an electromagnetic wave absorbing method according to an embodiment of the present invention.

In this embodiment mode 8, an circuit board 110 will now be explained as an example of the electronic component. In other words, as to the circuit board 110 according to this embodiment mode, such an electronic component as an IC 111 and an LSI 112 is mounted on one major surface thereof.

In this case, an electromagnetic wave absorbing device 113 is provided as a portion of this circuit board 110. This electromagnetic wave absorbing device 113 owns an electromagnetic wave absorbing structure constituted by a resistor portion 113a and also a plurality of dipole antennas 113b connected to both ends of this resistor portion 113a. In this embodiment, the resistor portion 113a may be formed by, for example, a printed resistor. Also, the dipole antenna 113b may be formed by, for instance, a metal plated pattern.

The length of the dipole antenna 113b of this electromagnetic wave absorbing device 113 is set to be equal to such a length which may be resonated with electromagnetic noise such as EMI probably produced from the electronic components, e.g., the IC 111 and the LSI 112, which are mounted on this-circuit board 110.

It should be understood that in this embodiment mode 8, since a plurality of electromagnetic wave absorbing devices 113 constructed of such dipole antennas 113b having the different antenna lengths are mounted on the circuit board 110, the electromagnetic noise and the higher harmonic waves thereof within an arbitrary wavelength range ("λ1" to "λ3") may be absorbed. Alternatively, it is also possible to employ a single electromagnetic wave absorbing device so as to absorb such electromagnetic noise having a specific wavelength and also a higher harmonic wave thereof.

As a consequence, since the electromagnetic noise such as EMI which may be probably emitted from the electronic components such as the IC 111 and the LSI 112 can be effectively absorbed so as to be disippated by the electromagnetic wave absorbing device 113, it is possible to provide the circuit board 110 having the superior electromagnetic noise suppression, from which the electromagnetic noise such as EMI is not emitted to the setting environment.

Embodiment Mode 9

Figure 12:
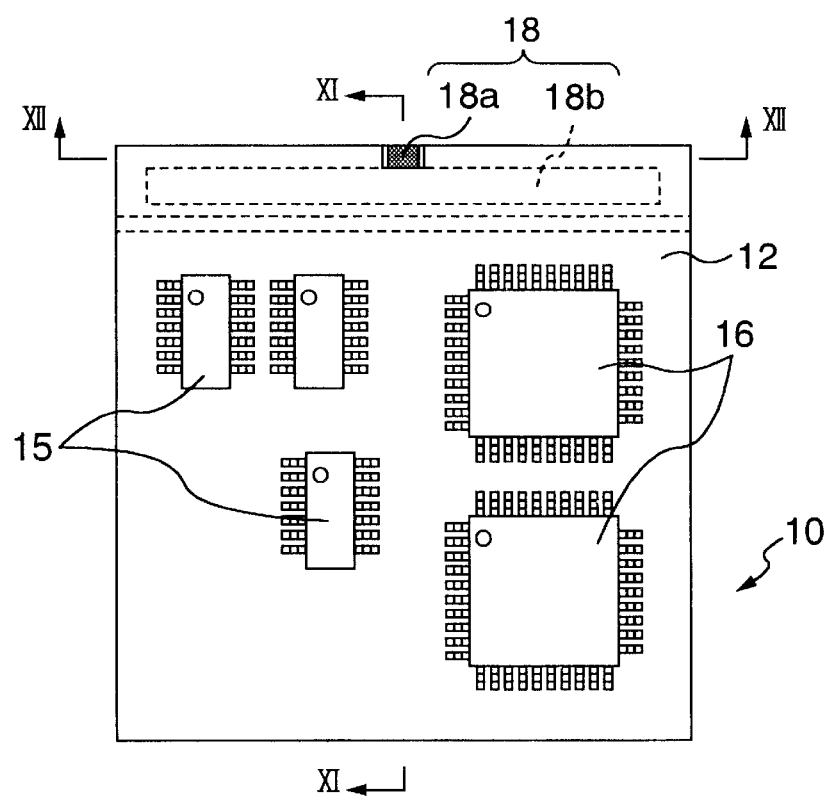
FIG. 12 is a plan view for representing an example of a structure of a circuit board corresponding to an example of the electronic component for embodying the electromagnetic wave absorbing method of the present invention.
Figure 13:
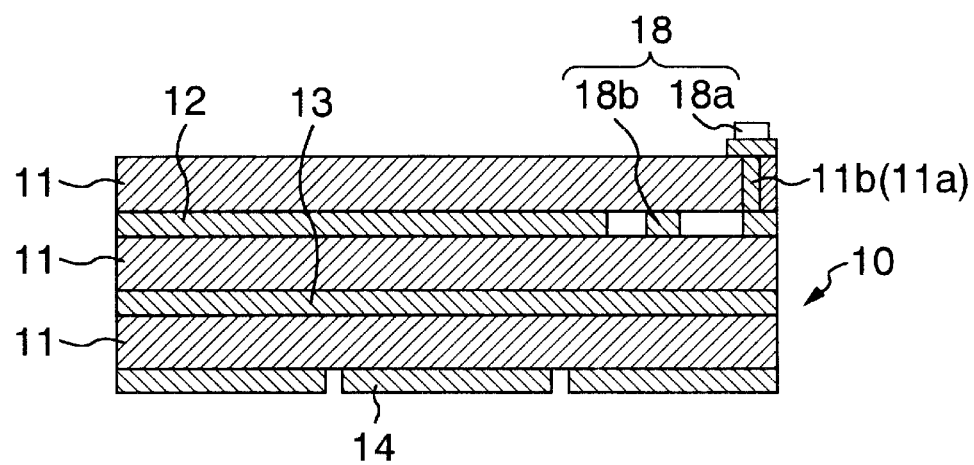
FIG. 13 is a sectional view for showing a portion, taken along a line XI—XI of the circuit board shown in FIG. 12.
Figure 14:
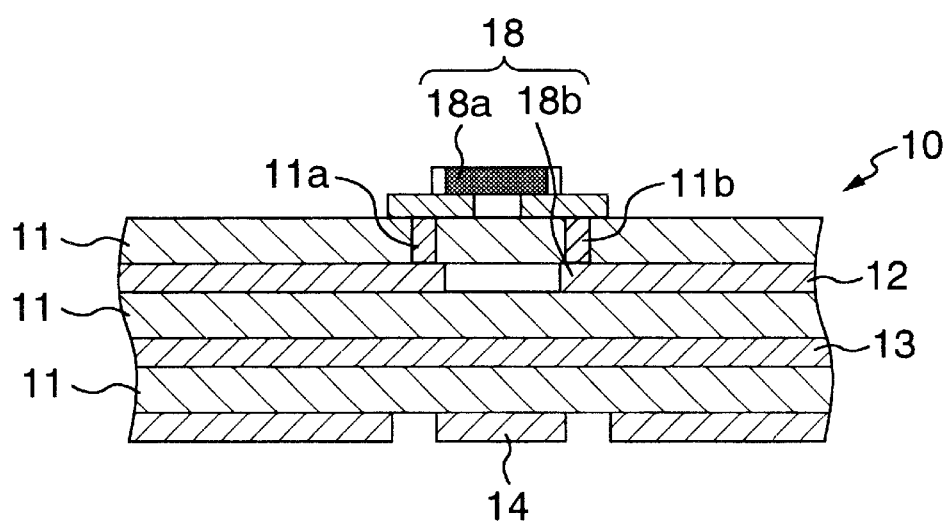
FIG. 14 is a sectional view for representing a portion, taken along a line XII—XII of the circuit board shown in FIG. 12.

FIG. 12 is a plan view for representing a modification of a structure of a circuit board corresponding to the electronic component for embodying the electromagnetic wave absorbing method according to the present invention. FIG. 13 is a sectional view for showing a portion of this circuit board, taken along a line XI—XI shown in FIG. 12. FIG. 14 is another sectional view for showing a portion of this circuit board, takes along a line XII—XII.

A circuit board 10, according to this embodiment mode 9, is structured in such a way that a ground pattern 12 and a power supply pattern 13, and furthermore, a wiring pattern 14 are stacked via a plurality of insulating layers 11 to each other. These ground pattern 12 and power supply pattern 13 will constitute a power supply system. The ground pattern 12, the power supply pattern 13, and the wiring pattern 14 are formed by, for example, a metal foil and metal plating and so on.

A plurality of ICs 15 and a plurality of LSIs 16, and the like are mounted on the uppermost insulating layer 11 of the circuit board 10. Since these ICs 15 and LSIs 16 are connected to a wiring pattern (not shown in detail) patterned on this uppermost insulating layer 11, and also connected via through holes and conductors to the ground pattern 12 and the power supply pattern 13, the ICs 15 and LSIs 16 receive the supply of operating power. The through holes are formed in the circuit board 10 along the thickness direction thereof, and the conductors are formed in these via holes. Furthermore, these ICs 15 and LSIs 16 are connected to the wiring pattern 14 so as to transmit/receive signals via the own wiring pattern 14, so that predetermined operations may be carried out.

In the embodiment mode 9 of FIG. 12, the electromagnetic wave absorbing device 18 is assembled inside the circuit board 18 having the multi-layer structure.

In other words, in accordance with this embodiment mode 9, the electromagnetic wave absorbing device 18 is constituted by a loop antenna 18b and a resistor portion 18a. The resistor portion 18a is arranged on the surface portion of the circuit board 10, and both ends of this resistor portion 18a are connected to the loop antenna 18b. The loop antenna 18b is formed in the step for manufacturing the ground pattern 12 under such a condition that while the loop antenna 18b is isolated from this ground pattern 12, a portion of this loop antenna 18b is opened. The loop antenna 18b of this electromagnetic wave absorbing device 18 is formed in combination with the ground pattern 12 on the same plane in this circuit board 10.

That is to say, as exemplified in FIG. 13 and FIG. 14, since both ends of the loop antenna 18b are connected via the via hole 11a and the conductor pattern to both end of the resistor portion 18a mounted on the surface of the circuit board 10, the electromagnetic wave absorbing device 18 is constituted. The via hole 11a is formed in the uppermost insulating layer 11 of the circuit board 10, and the conductor pattern is provided inside the via hole 11b. The length of this loop antenna 18b is set to be equal to such a length which is resonated with electromagnetic noise such as EMI and higher harmonic waves thereof possibly produced from the circuit board 10, the IC 15, the LSI 16, and the like.

Then, the electromagnetic noise and the higher harmonic waves thereof, which are produced from the circuit board 10, the IC 15, the LSI 16, and the like, are absorbed by this electromagnetic wave absorbing device 18 to be therefore dissipated. As a result, it is possible to realize the occurrence of the electromagnetic noise such as EMI.

In addition, the below-mentioned subsidiary effect of this electromagnetic wave absorbing device 18 may be achieved. That is, since such a current is produced in the electromagnetic wave absorbing device 18, which may reduce a stray current flowing through the ground pattern 12 by way of the electromagnetic coupling, this current is effectively converted into thermal energy by the resistor portion 18a so as to be dissipated. As a result, even in the power supply system arranged by the ground pattern 12 and the power supply pattern 13, the antiresonance is suppressed, and the reduction of the impedance of this power supply system can be realized.

Alternatively, instead of the resistor portion 18a, the following equivalent structure may be achieved. That is, while the loop antenna 18b is made of a closed shape, a portion of this loop antenna 18b may be made narrow so as to form a high resistor portion. Furthermore, this loop antenna portion may be changed into a conductor having a high resistivity by using the annealing method, or other processing methods.

Embodiment Mode 10

Figure 15:
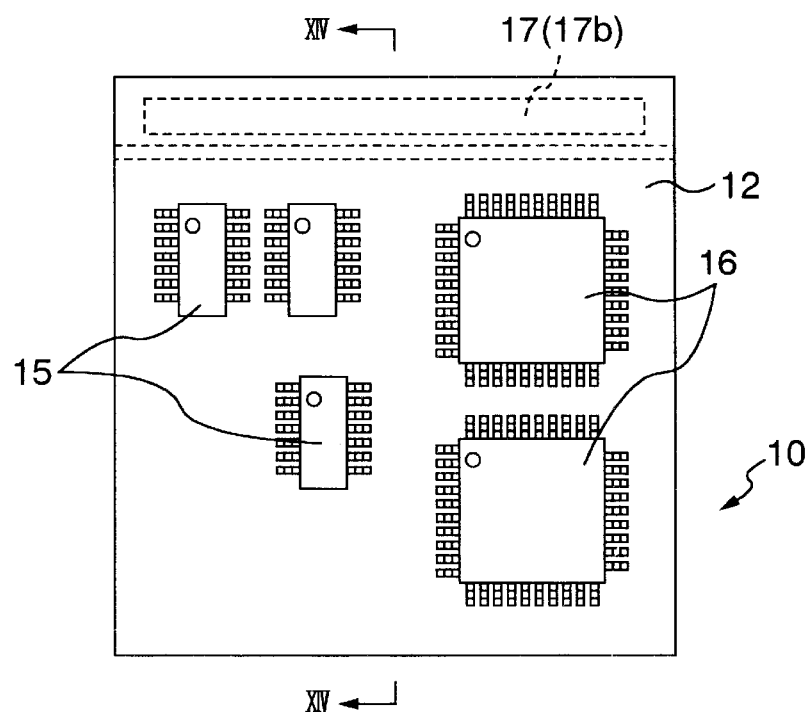
FIG. 15 is a plan view for representing a modification of the structure of the circuit board for embodying the electromagnetic wave absorbing method of the present invention.
Figure 16:
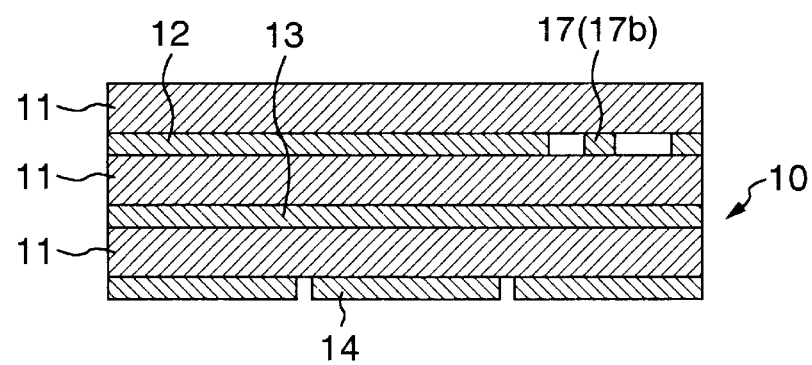
FIG. 16 is a sectional view for showing a portion, taken along a line XIV—XIV of the circuit board shown in FIG. 15.

FIG. 15 is a plan view for representing one example of a structure of a circuit board corresponding to the electronic component for embodying the electromagnetic wave absorbing method according to the present invention. FIG. 16 is a sectional view for showing a portion of this circuit board, taken along a line XIV—XIV shown in FIG. 15.

A circuit board 10, according to this embodiment mode 10, is structured in such a way that a ground pattern 12 and a power supply pattern 13, and furthermore, a wiring pattern 14 are stacked via a plurality of insulating layers 11 to each other. These ground pattern 12 and power supply pattern 13 will constitute a power supply system. The ground pattern 12, the power supply pattern 13, and the wiring pattern 14 are formed by, for example, a metal foil and metal plating and so on.

A plurality of ICs 15 and a plurality of LSIs 16, and the like are mounted on the uppermost insulating layer 11 of the circuit board 10. Since these ICs 15 and LSIs 16 are connected to a wiring pattern (not shown in detail) patterned on this uppermost insulating layer 11, and also connected via through holes and conductors to the ground pattern 12 and the power supply pattern 13, the ICs 15 and LSIs 16 receive the supply of operating power. The through holes are formed in the circuit board 10 along the thickness direction thereof, and the conductors are formed in these via holes. Furthermore, these ICs 15 and LSIs 16 are connected to the wiring pattern 14 so as to transmit/receive signals via the own wiring pattern 14, so that predetermined operations may be carried out.

An electromagnetic wave absorbing device 17 is provided independent from the ground pattern 12 on this ground pattern 12 of the circuit board 10. This electromagnetic wave device 17 is constituted by a loop antenna 17b having a closed shape and made of the same conductor as the ground pattern 12. In other words, the loop antenna 17b of this electromagnetic wave absorbing device 17 is formed in combination with the ground pattern 12 on the same plane in this circuit board 10. Also, this loop antenna 17b is formed in parallel to and adjacent to the edge portion of the ground pattern 12. The length of this loop antenna 17b is set to be equal to such a length which is resonated with electromagnetic noise such as EMI and higher harmonic waves thereof possibly produced from the circuit board 10, the IC 15, the LSI 16, and the like.

In the above-described electromagnetic wave absorbing apparatus 17 according to this embodiment mode 10, a resistor of a portion of the loop antenna 17b may have the function as the resistor portion of such a type of electromagnetic wave absorbing structure as FIG. 2. Preferably, the resistance value of this resistor portion is located within a range defined from several ohms and several hundreds ohms.

Also, in this case, electromagnetic noise such as EMI and higher harmonic waves thereof, which are produced from the circuit board 10, the IC 15, the LSI 16, and the like, may be resonated with the loop antenna 17b to thereby induce a high frequency current. Then, this high frequency current is converted into thermal energy by the resistor owned by this loop antenna 17b, so that this high frequency current may be dissipated. As a result, the electromagnetic noise and the higher harmonic waves thereof may be dissipated and the external emissions thereof may be suppressed.

Also, this electromagnetic wave absorbing device 17 may achieve the following subsidiary effect. That is, under operating condition, a current will flow through this electromagnetic wave absorbing device 17, which may reduce the current flowing through the ground pattern 12. The first-mentioned current is converted into thermal energy, so that antiresonance caused by a standing wave and the like appearing in the ground pattern 12 may be suppressed. Therefore, the reduction of the power supply system impedance can be realized. In other words, it is no longer required to supply such power capable of canceling an increase of the power supply system impedance which is caused by the standing wave and the like produced in the ground pattern 12. As a result, it is possible to realize the reductions of the power consumption and furthermore of the power supply capacity. In addition, it is possible to avoid an EMI problem which is caused by that an external connection cable (not shown in detail) connected to the circuit board 10 is energized as an antenna by the standing wave produced in the ground pattern 12.

It should be understood that in FIG. 15 and FIG. 16, such a case that the electromagnetic wave absorbing device 17 is provided in the ground layer is exemplified. Alternatively, the electromagnetic wave absorbing device 17 may be similarly formed in the power supply pattern 13 (namely, power supply layer). Also, in the examples shown in FIG. 15 and FIG. 16, the electromagnetic wave absorbing device 17 is arranged in only one edge of the circuit board 10. Alternatively, since the electromagnetic wave absorbing devices 17 may be arranged in a parallel manner within each of more than two edges of this circuit board 10, there is another advantage that the power supply system impedance may be further reduced by canceling the currents with each other, and also the occurrence of EMI noise may be prevented by canceling the currents with each other.

Embodiment Mode 11

Figure 17:
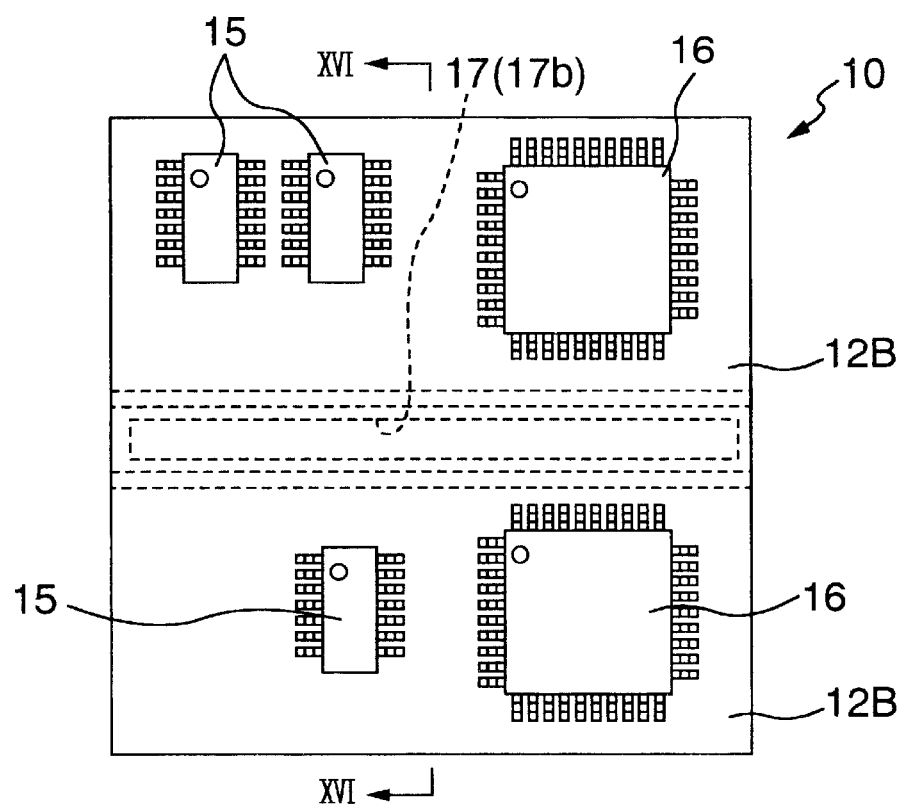
FIG. 17 is a plan view for representing another modification of the structure of the circuit board for embodying the electromagnetic wave absorbing method of the present invention.
Figure 18:
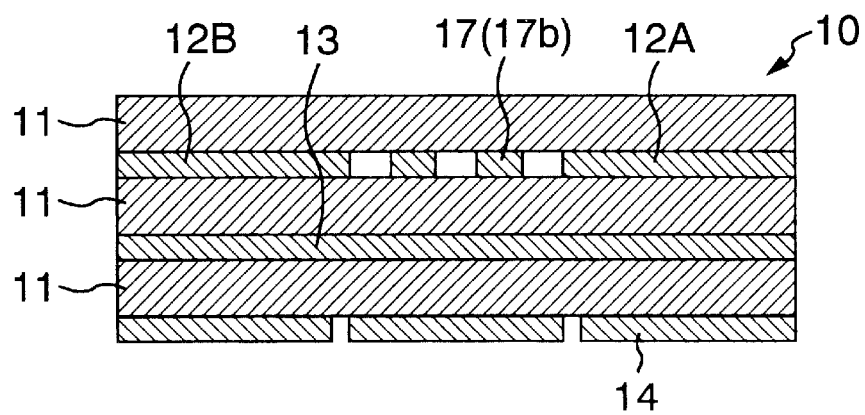
FIG. 18 is a sectional view for showing a portion, taken along a line XVI—XVI of the circuit board shown in FIG. 17.

FIG. 17 is a plan view for representing another modification of a structure of a circuit board corresponding to the electronic component for embodying the electromagnetic wave absorbing method according to the present invention. FIG. 18 is a sectional view for showing a portion of this circuit board, taken along a line XVI—XVI shown in FIG. 17.

In this embodiment mode 11 of FIG. 17 and FIG. 18, a ground pattern of a circuit board 10 is electrically separated into two sets of a ground pattern 12A and another ground pattern 12B, and then an electromagnetic wave absorbing device 17 is mounted between these separated ground patterns 12A and 12B. Also, in this case, the electromagnetic wave absorbing device 17 can absorb electromagnetic noise in such a manner that the resistor specific to the loop antenna 17b having the closed loop may having such a function of a resistor portion capable of converting a high frequency current induced from an electromagnetic wave to be absorbed into thermal energy.

Also, this electromagnetic wave absorbing device 17 may achieve the following subsidiary effect. That is, since this electromagnetic wave absorbing device 17 is employed, antiresonance caused by a standing wave and the like appearing in the ground patterns 12A and 12B may be suppressed. Therefore, the reduction of the power supply system impedance and the prevention of EMI noise can be realized.

It should also be noted that FIG. 17 and FIG. 18 represent such a case that the ground pattern is electrically subdivided into two sets of ground patterns. Alternatively, when the ground pattern is subdivided into more than two ground patterns, since the electromagnetic wave absorbing devices 17 may be mounted among these subdivided ground patterns, a similar effect may be achieved. That is, the power supply system impedance may be reduced and the occurrence of the EMI noise may be avoided.

Embodiment Mode 12

Figure 19:
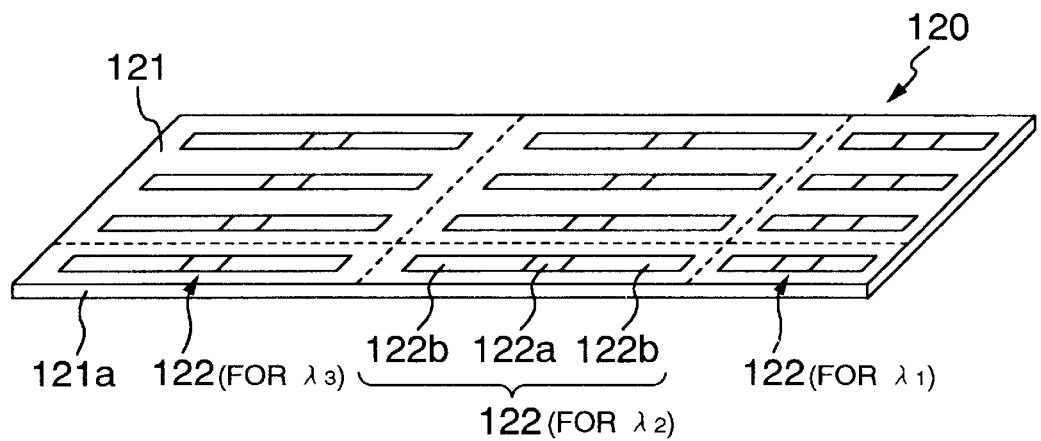
FIG. 19 is a perspective view for showing an example of a structure of an electromagnetic wave absorbing device for embodying the electromagnetic wave absorbing method according to one embodiment of the present invention.

FIG. 19 is a perspective view for showing an example of a structure of an electromagnetic wave absorbing device used to embody an electromagnetic wave absorbing method according to an embodiment mode of the present invention.

An electromagnetic wave absorbing device 120, according to this embodiment mode 12, is arranged in such a manner that a plurality of electromagnetic wave absorbing structures 122 are formed either on a surface or inside an insulating film 121 having a flexible characteristic and made of, for example, resin and the like, and each of these plural electromagnetic wave absorbing structures 122 is constituted by a resistor portion 122a and a plurality of dipole antennas 122b connected to both ends of this resistor portion 122a. The resistor portion 122a may be formed by, for example, a printed resistor. Also, the dipole antenna 122b may be formed by, for instance, a metal plated pattern. Further, one major surface of the insulating film 121 is made of an adhesive surface 121a on which an adhesive material and the like are coated.

The entire construction of this electromagnetic wave absorbing device 120 can be freely folded. As a result, this foldable electronic magnetic wave absorbing device 120 can be freely attached to any device mounting planes having arbitrary shapes such a flat surface, a curved surface, a stepped surface, and a concave/convex surface so as to be mounted thereon.

In the embodiment shown in FIG. 19, a plurality of electromagnetic wave absorbing structures 122 whose dipole antennas 122b own the same lengths (namely, electromagnetic wave absorbing characteristics are equal to each other) are arranged along the width direction of the insulating film 121, whereas a plurality of electromagnetic wave absorbing structures 122 whose dipole antennas 122b own the different lengths from each other are arranged along the longitudinal direction of the insulating film 121.

Then, a plurality of electromagnetic wave absorbing structures 122 having the same, or different absorbing characteristics, or a single electromagnetic wave absorbing structure 122 is arbitrarily cut out together with the insulating film 121 along a cut out line indicated by a broken line of FIG. 19. Then, the cut electromagnetic wave absorbing structures are attached to a subject matter such as an arbitrarily selected electric appliance, so that the harmful electromagnetic noise prevention can be effectively achieved in a simple manner. That is, these electromagnetic wave absorbing structures 122 can absorb the electromagnetic noise and the higher harmonic waves thereof, which are produced from the inside portion of this electronic appliance, and also can absorb such electromagnetic noise emitted from this electronic appliance into the setting environment, so that the adverse influence given to this electronic appliance, which is caused by this electromagnetic noise, can be prevented.

As previously explained, in accordance with the electromagnetic wave absorbing device 120 of this embodiment mode 12, the electromagnetic wave absorbing structures 120 having arbitrary absorbing characteristics can be freely mounted on any portions having arbitrary shapes of electronic appliances in such a manner that these electromagnetic wave absorbing structures 122 are attached to these portions of any electronic appliances via the adhesive surface 121a of the flexible insulating film 121. As a consequence, such electromagnetic noise and higher harmonic waves thereof, which could not be predicted from the designing stage of this electronic appliance and also the manufacturing stage thereof, can be readily and surely prevented at an arbitrary stage after the manufacture and the market.

Embodiment Mode 13

Figure 20:
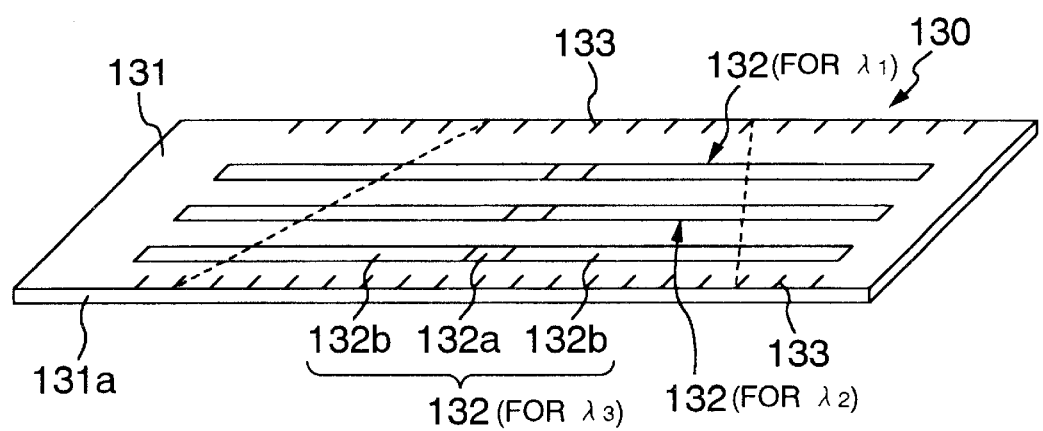
FIG. 20 is a perspective view for showing another example of a structure of an electromagnetic wave absorbing device for embodying the electromagnetic wave absorbing method according to one embodiment of the present invention.

FIG. 20 is a perspective view for showing another example of a structure of an electromagnetic wave absorbing device used to embody an electromagnetic wave absorbing method according to an embodiment mode of the present invention.

An electromagnetic wave absorbing device 130, according to this embodiment mode 13, is arranged in such a manner that a plurality of electromagnetic wave absorbing structures 132 are formed either or a surface or inside an insulating film 131 having a flexible characteristic and made of, for example, resin and the like, and each of these plural electromagnetic wave absorbing structures 132 is constituted by a resistor portion 132a and a plurality of dipole antennas 132b connected to both ends of this resistor portion 132a. Further, one major surface of the insulating film 131 is made of an adhesive surface 131a on which an adhesive material and the like are coated.

In the embodiment shown in FIG. 20, a plurality of electromagnetic wave absorbing structures 132 whose dipole antennas 132b own the sufficiently long lengths are arranged along the width direction of the insulating film 131.

Then, as exemplified by a broken line of FIG. 20, since a half way of this dipole antenna 132b is cut out in combination with the insulating film 131 in such a manner that this dipole antenna 132b may have a necessary length, such an electromagnetic wave absorbing device 130 containing the electromagnetic wave absorbing structure 132 having an arbitrary absorbing characteristic can be used to be attached to a desirable electronic appliance.

FIG. 20 exemplifies such a case that the electromagnetic wave absorbing device 130 containing the dipole antennas 133*b* having the different lengths from each other (namely, having different electromagnetic wave absorbing characteristics) can be freely obtained in the actual use fields by executing the following treatment. That is, two places of the insulating film 131 are cut along an oblique direction in the width direction of this film in such a manner that a plurality of electromagnetic wave absorbing structures 132 are intersected by this cutting lines, and moreover, the lengths of the dipole antennas 132*b* of the respective electromagnetic wave absorbing structures 132 may establish a symmetrical relationship with respect to the resistor portion 132*a*.

Also, in this embodiment mode 13, a cutting scale 133 may be formed in a side edge of this insulating film 131 along a longitudinal direction thereof, if required. As a result, when the insulating film 131 is cut out in the actual use field, an operator may precisely visually confirm a relationship between a cut out length of the dipole antenna 132*b* and an electromagnetic wave absorbing characteristic (wavelength and frequency etc.) by using this cutting scale 133.

Embodiment Mode 14

Figure 21:
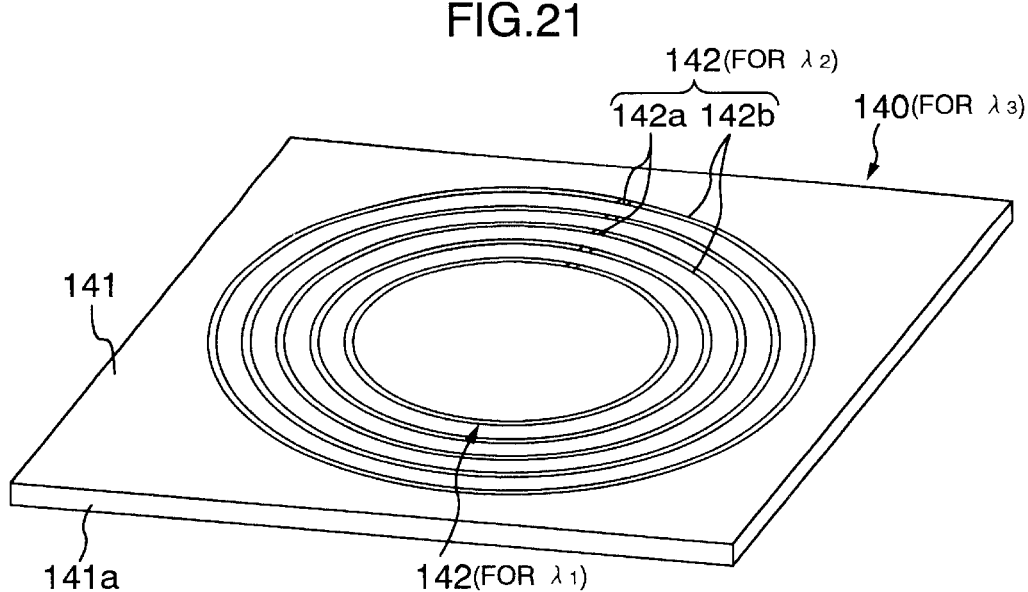
FIG. 21 is a perspective view for showing another example of a structure of an electromagnetic wave absorbing device for embodying the electromagnetic wave absorbing method according to one embodiment of the present invention.

FIG. 21 is a perspective view for showing another example of a structure of an electromagnetic wave absorbing device used to embody an electromagnetic wave absorbing method according to an embodiment mode of the present invention.

An electromagnetic wave absorbing device 140, according to this embodiment mode 14, is arranged in such a manner that a plurality of electromagnetic wave absorbing structures 142 are formed in a coaxial shape either on a surface or inside an insulating film 141 having a flexible characteristic and made of, for example, resin and the like, and each of these plural electromagnetic wave absorbing structures 143 is constituted by a resistor portion 142*a* and a plurality of dipole antennas 142*b* connected to both ends of this register portion 142*a*. As a result, this electromagnetic wave absorbing device 140 can absorb electromagnetic noise and higher harmonic waves thereof appearing within a wavelength range corresponding to a length distribution range of the loop antenna 142*b*. It should also be understood that a total quantity of the electromagnetic wave absorbing structures 142 may be selected to be 1. Further, one major surface of the insulating film 141 is made of an adhesive surface 141*a* on which an adhesive material and the like are coated.

Then, this electromagnetic wave absorbing device 140 is attached via the adhesive surface 141*a* to a desirable electric appliance, so that the harmful electromagnetic noise prevention can be effectively achieved in a simple manner. That is, these electromagnetic wave absorbing structures 142 can absorb the electromagnetic noise and the higher harmonic waves thereof, which are produced from the inside portion of this electronic appliance, and also can absorb such electromagnetic noise emitted from this electronic appliance into the setting environment, so that the adverse influence given to this electronic appliance, which is caused by this electromagnetic noise, can be prevented.

Embodiment Mode 15

Figure 22:
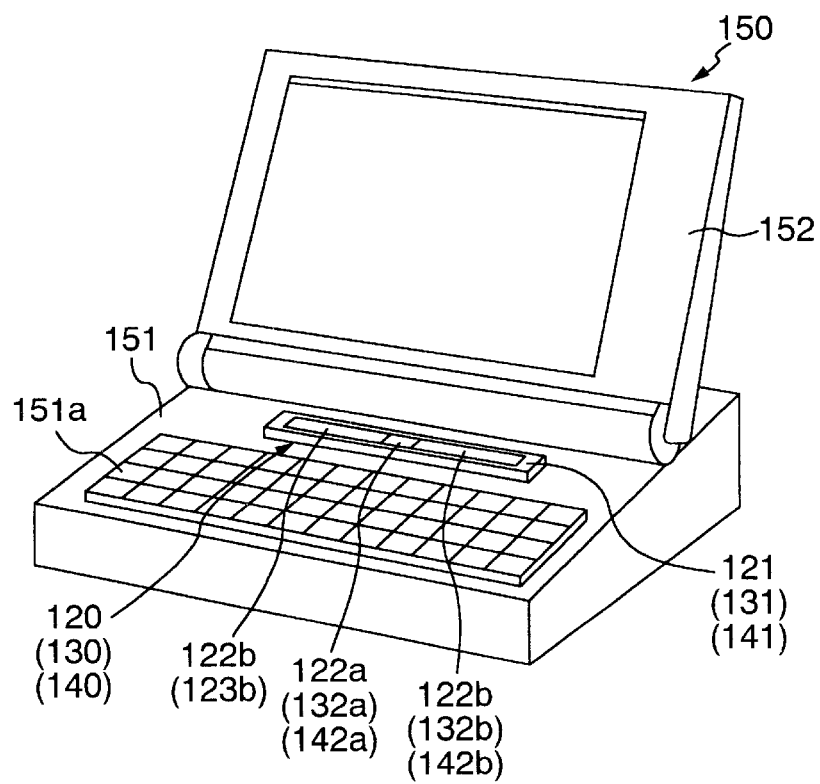
FIG. 22 is a perspective view for representing an example of a construction of an electronic appliance equipped with the electromagnetic wave absorbing device for embodying the electromagnetic wave absorbing method according to one embodiment of the present invention.

FIG. 22 is a perspective view for representing an example of a construction of an electronic appliance equipped with an electromagnetic wave absorbing device for embodying an electromagnetic wave absorbing method according to an embodiment mode of the present invention.

In this embodiment mode 15, an information processing apparatus 150 such as a portable personal computer is exemplified as an example of this electronic appliance. That is, an information processing apparatus 150, according to this embodiment mode 15, contains a housing 151 on which a keyboard 151*a* is mounted, and a display unit 152 such as a liquid crystal display (LCD). This liquid crystal display is freely folded with respect to the housing 151. A mother board and the like are built in this housing 151. For example, a general-purpose microprocessor, a semiconductor memory, an input/output control element, and the like are mounted on this mother board.

There is such a risk that when such an information processing apparatus 150 is operated, this information processing apparatus 150 emits electromagnetic noise such as EMI to the setting environment thereof. Therefore, in accordance with this embodiment mode 15, for instance, since the above-explained electromagnetic wave absorbing devices 120 to 140 shown in FIG. 19 to FIG. 21 are attached to a portion of the housing 151, these electromagnetic wave absorbing devices 120 to 140 can suppress the electromagnetic noise such as EMI and the higher harmonic waves thereof emitted from this information processing apparatus 150 to the setting environment thereof.

FIG. 22 exemplifies such a case that the electromagnetic wave absorbing devices 120 to 140 are attached on the upper surface of the housing 151 as the mounting positions thereof. Alternatively, the mounting positions may be selected in the different manner. That is, for example, while the attaching positions of the electromagnetic wave absorbing devices 120 to 140 are varied, the radiation strengths of electromagnetic noise such as EMI and also the wavelengths thereof are measured. Then, such a position where the radiation strength becomes minimum.

It is conceivable that the radiation conditions of the electromagnetic noise such as EMI may be changed, since the information processing apparatus 150 is extended with a connection appliance and the like (not shown in detail). However, it should be understood that radiation intensity and wavelength can be measured with changing the attaching positions or the number of these electromagnetic wave absorbing devices 120 to 140 to search most proper portion of the devices in a simple manner. As a consequence, the effective electromagnetic noise prevention can be achieved by not only product manufactures, commercial managers, but also by end users and so on.

Embodiment Mode 16

Figure 23:
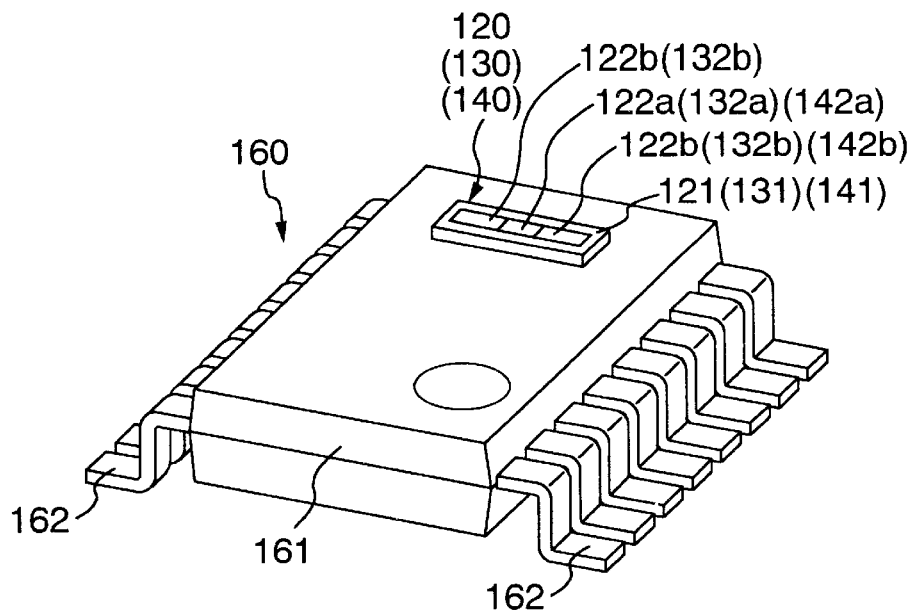
FIG. 23 is a perspective view for representing another example of a construction of an electronic appliance equipped with the electromagnetic wave absorbing device for embodying the electromagnetic wave absorbing method according to one embodiment of the present invention.

FIG. 23 is a perspective view for representing another example of a construction of an electronic appliance equipped with an electromagnetic wave absorbing device for embodying an electromagnetic wave absorbing method according to an embodiment mode of the present invention.

In this embodiment mode 16, the electromagnetic wave absorbing device is applied to a semiconductor device 160 as an example of this electronic appliance. That is, the semiconductor device 160, according to this embodiment mode 16, is constituted by a package 161 and a plurality of leads 162. The package 161 is made of molded resin, and is used to seal thereinto a semiconductor chip (not shown in detail) having a desirable function. The plural leads 162 are projected from this package 161, and inner edge portions thereof are connected to the semiconductor chip.

There is such a risk that when such a semiconductor chip sealed inside the package 161 is operated, this semiconductor chip emits electromagnetic noise such as EMI to the setting environment thereof. Therefore, in accordance with this embodiment mode 16, for instance, since the above-explained electromagnetic wave absorbing deices 120 to 140 shown in FIG. 19 to FIG. 21 are attached to a portion of the package 161, these electromagnetic wave absorbing devices 120 to 140 can suppress the electromagnetic noise such as EMI and the higher harmonic waves thereof emitted from this semiconductor device 160 to the setting environment thereof.

Also, in this case, no change is required for the structure itself of this semiconductor device 160. The electromagnetic noise such as EMI and the higher harmonic waves thereof can be effectively and surely suppressed in a simple manner by merely selecting the attaching positions and the specifications such as the absorbed wavelengths.

Embodiment Mode 17

Figure 24:
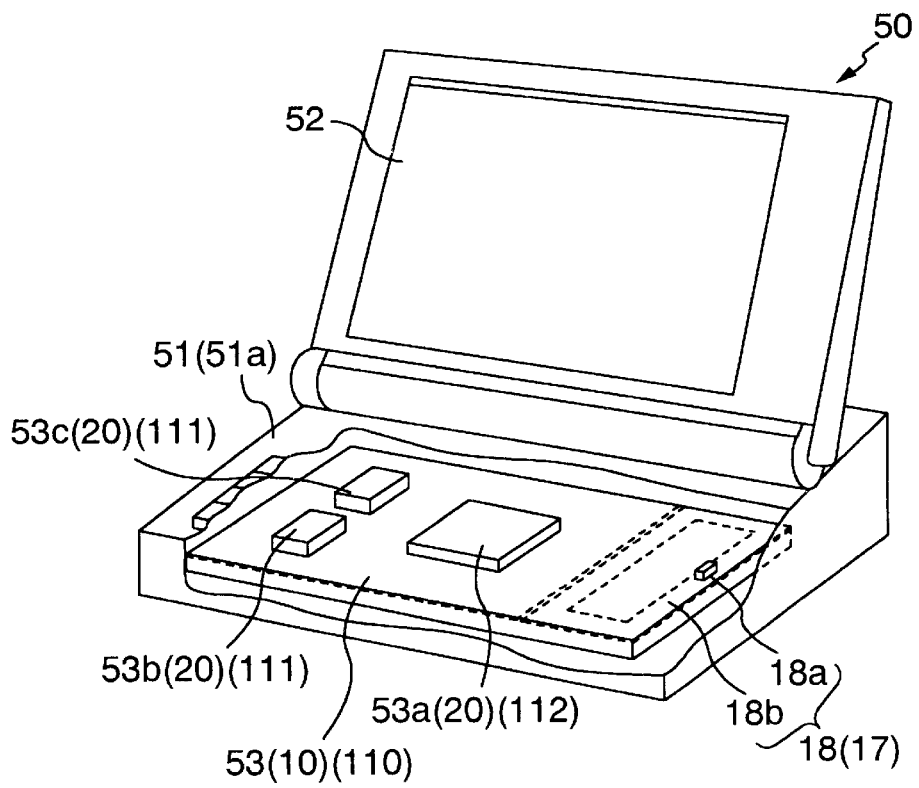
FIG. 24 is a perspective view for fragmentarily showing an example of another construction of the electronic appliance according to one embodiment of the present invention.

FIG. 24 is a partially broken view for representing another example of a construction of an electronic appliance equipped with an electromagnetic wave absorbing device for embodying an electromagnetic wave absorbing method according to an embodiment mode of the present invention.

In this embodiment mode 17, an information processing apparatus 50 such as a portable personal computer is exemplified as an example of this electronic appliance. That is, an information processing apparatus 50, according to this embodiment mode 17, contains a housing 51 on which a keyboard 51a is mounted, and a display unit 52 such as a liquid crystal display (LCD). This liquid crystal display is freely folded with respect to the housing 51. A circuit board 53 such as a mother board is built in this housing 51. For example, a general-purpose microprocessor 53a, a semiconductor memory 53b, an input/output control element 53c, and the like are mounted on this mother board. As this circuit board 53, the circuit board 10 equipped with the electromagnetic wave absorbing device 18 and the electromagnetic wave absorbing device 17 is employed, as exemplified in FIG. 10, FIG. 13, and FIG. 15, so that the electromagnetic noise such as EMI and the higher harmonic waves thereof can be suppressed.

Also, the general-purpose microprocessor 53a, the semiconductor memory 53b, and the input/output control element 53c, which are mounted on the circuit board 53, may be arranged by the semiconductor device 100 shown in FIG. 8, and the semiconductor device 200 exemplified in FIG. 9 and FIG. 10.

As a consequence, the electromagnetic noise such as EMI produced when the information processing apparatus 50 can be suppressed, so that the performance of this information processing apparatus 50 can be improved.

While the present invention has been described with reference to various embodiment modes in detail, the present invention is not limited thereto, but may be modified, changed, and substituted without departing from the technical scope and spirit of the present invention.

For instance, the semiconductor devices and the information processing apparatuses have been exemplified as the electronic appliances in the foregoing description. However, the present invention is not limited only to these examples, but may be widely applied to all of electronic appliances which require the noise suppressing measures, for instance, mobile communication appliances such as portable telephones.

What is claimed is:

1. An electromagnetic wave absorbing device for suppressing noise by absorbing electromagnetic waves, comprising:

a metal loop having a portion that has a resistance having a resistance value higher than or equal to 20 ohms, said metal loop arranged to receive electromagnetic waves from electronic equipment to which said electromagnetic wave absorbing device is attached, such that said resistance decreases a current induced by the electromagnetic waves received from said electronic equipment, and said resistance being adapted in the electromagnetic wave absorbing device to suppress noise by absorbing the electromagnetic waves.

2. An electromagnetic wave absorbing device as claimed in claim 1 wherein:

said resistance of said portion has a resistance value lower than or equal to 200 ohms, whereas the remaining portion of said metal loop has a resistance value lower than or equal to 1 ohm.

3. An electromagnetic wave absorbing device as claimed in claim 1 wherein:

said electromagnetic wave absorbing device has an adhesive surface which is adhered to a noise producing circuit.

4. An electromagnetic wave absorbing device as claimed in claim 1 wherein:

said metal loop of said electromagnetic wave absorbing device is manufactured in a wafer process of an integrated circuit.

5. An electromagnetic wave absorbing device as claimed in claim 1 wherein:

said electromagnetic wave absorbing device further comprises another metal loop near to said portion of said metal loop, an electromagnetic wave absorbing dimension of said another metal loop being different from an electromagnetic wave absorbing dimension of a remaining portion of said metal loop.

* * * * *